(12) United States Patent
Kahveci et al.

(10) Patent No.: US 6,938,080 B1
(45) Date of Patent: Aug. 30, 2005

(54) METHOD AND COMPUTER SYSTEM FOR MANAGING DATA EXCHANGES AMONG A PLURALITY OF NETWORK NODES IN A MANAGED PACKET NETWORK

(75) Inventors: Tunc M. Kahveci, Morrisville, NC (US); Jason G. Emery, Apex, NC (US)

(73) Assignee: Nortel Networks Limited, St. Laurent ( * ) Notice: Subject to any disclaimer, the term of this patent is extended or adjusted under 35 U.S.C. 154(b) by 724 days.

(21) Appl. No.: 09/589,414

(22) Filed: Jun. 7, 2000

(51) Int. Cl.⁷ .......................................... G06F 15/173
(52) U.S. Cl. ...................... 709/223; 709/203; 709/226; 709/229
(58) Field of Search ............................... 709/227, 238, 709/245, 203, 223, 226, 229; 705/26, 31, 705/35; 713/171, 201; 714/31

(56) References Cited

U.S. PATENT DOCUMENTS

| | | | | |
|---|---|---|---|---|
| 5,784,463 A | * | 7/1998 | Chen et al. | 713/171 |
| 5,964,891 A | * | 10/1999 | Caswell et al. | 714/31 |
| 5,970,473 A | * | 10/1999 | Gerszberg et al. | 705/26 |
| 5,991,746 A | * | 11/1999 | Wang | 705/40 |
| 6,006,266 A | * | 12/1999 | Murphy et al. | 709/227 |
| 6,049,877 A | * | 4/2000 | White | 713/201 |
| 6,158,011 A | * | 12/2000 | Chen et al. | 713/201 |
| 6,233,565 B1 | * | 5/2001 | Lewis et al. | 705/35 |
| 6,304,578 B1 | * | 10/2001 | Fluss | 370/413 |
| 6,324,267 B1 | * | 11/2001 | Hraster et al. | 379/93.02 |
| 6,341,127 B1 | * | 1/2002 | Katsube et al. | 370/352 |
| 6,341,353 B1 | * | 1/2002 | Herman et al. | 713/201 |
| 6,363,434 B1 | * | 3/2002 | Eytchison | 709/245 |
| 6,470,378 B1 | * | 10/2002 | Tracton et al. | 709/203 |
| 6,516,416 B2 | * | 2/2003 | Gregg et al. | 713/201 |
| 6,563,793 B1 | * | 5/2003 | Golden et al. | 709/238 |

* cited by examiner

Primary Examiner—Rupal Dharia
Assistant Examiner—Quang N. Nguyen

(57) ABSTRACT

A residential access node (RAN) running a RAN platform 112 which includes means for interfacing a plurality of peripheral equipment such as analog (POTS) phones 114, standard televisions 116, computers 118, IP telephones 120, and high definition televisions 122 to a packet data network 100. The Network Access Provider RAN platform 124 manages sessions among Customer Premises RAN platforms 112 and Application Service Provider RAN platforms 110 over high bandwidth connections. The Customer Premises RAN platform 112 also determines the number and type of data packets entering or departing via the packet data network 100. Such an architecture allows for the efficient transfer of services (data content) from Application Service Providers to individual network access subscribers by seamlessly accommodating various data types and providing an integrated metering and billing mechanism managed by the Network Access Provider.

31 Claims, 8 Drawing Sheets

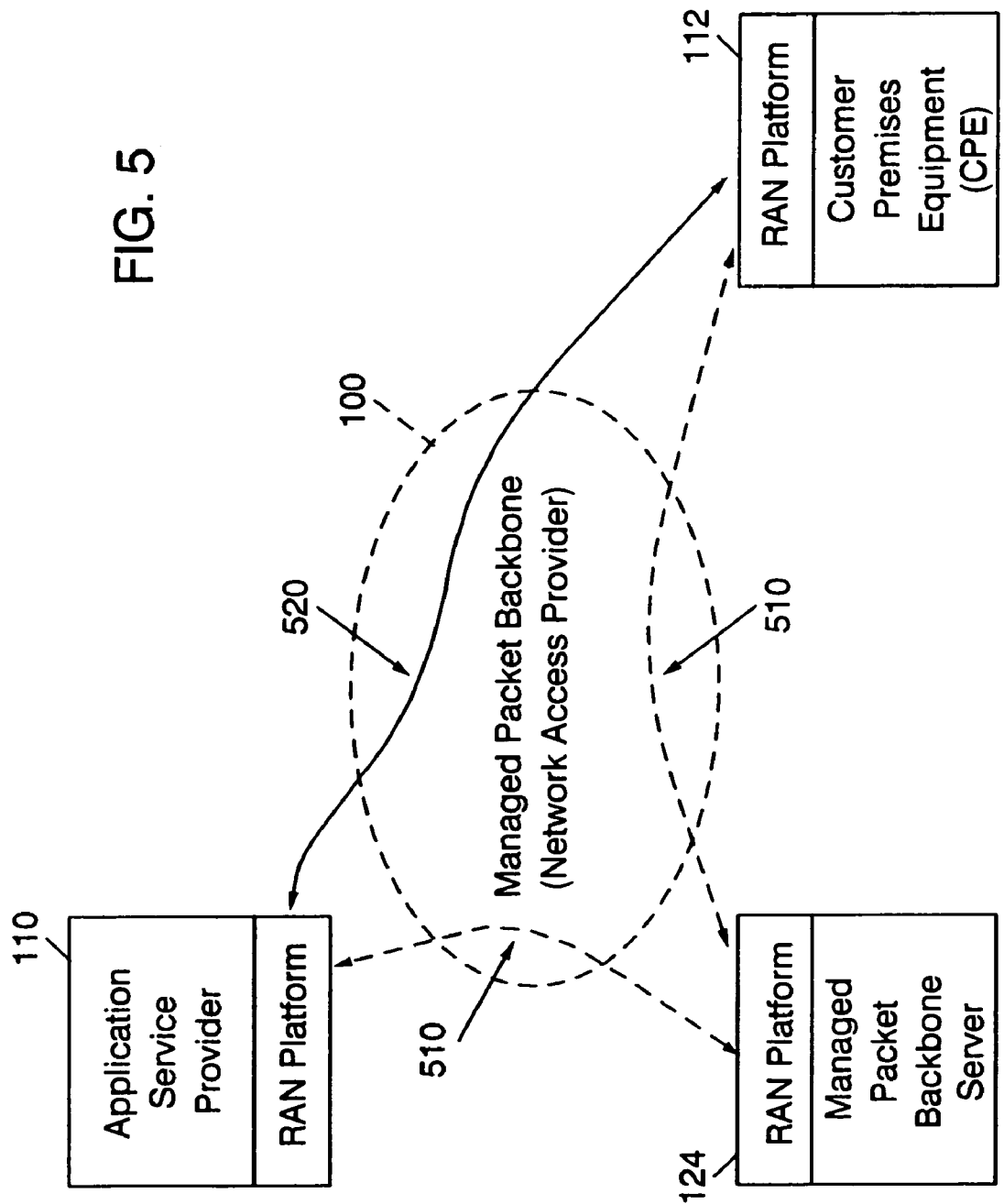

METHOD AND COMPUTER SYSTEM FOR MANAGING DATA EXCHANGES AMONG A PLURALITY OF NETWORK NODES IN A MANAGED PACKET NETWORK

FIELD OF THE INVENTION

The present invention relates generally to a method and apparatus for delivering and metering high bandwidth multimedia content and services from Application Service Providers to subscribers utilizing a managed packet backbone network.

BACKGROUND OF THE INVENTION

Several market dynamics have come together recently to create an environment for significant change in the computer and telecommunication industries. Explosive growth of the Internet has led to changes in the way regional telephone companies (telcos) view their networks. The Telecommunications Act of 1996 spawned an environment where entrepreneurs can capitalize on niche openings, and large corporations (e.g. Public Utilities) find themselves in position to offer new revenue generating services. Technical advances in personal computers and network router technology have created an environment where next generation multimedia applications are ready to skyrocket. Recent corporate mergers have brought the cable industry to the forefront of the telecommunications market while other mergers and new market entrants have shown that the long haul backbone is moving to packet based technology.

These changes taken independently result in interesting evolutionary steps that can be implemented within the framework of existing product platforms and processes. Taken as a whole, however, they beckon a revolution—a new class of telecommunications products and a new network paradigm.

Until the late 1970's analog techniques were used in the Public Switched Telephone Network (PSTN). The Customer Premise Equipment (CPE), a residential phone or private branch exchange, were analog and the circuits connecting the CPE to a telco central office were analog. Analog techniques were used to switch telephone calls within the central office as well as between central offices.

Digital switches and ISDN introduced techniques for converting analog speech to digital bit streams. The conversion was standardized. Digital techniques supplanted analog and were used to switch telephone calls within a central office as well as between central offices.

At the sending end, the analog to digital conversion standard requires sampling the analog signal every 125 microseconds and coding the sample into an eight-bit number that represents the analog amplitude. The sampling and coding follow recommendation G.711. The coded eight bit numbers are placed in 64 KBPS channels. For analog circuits coding occurs in the interface card at the central office and for ISDN lines coding occurs at the CPE. This function is often referred to as a Code/Decode or CODEC function.

The G.711 recommendation specifies 64 KBPS per conversation, which for standard human conversations is overkill. The average human conversation requires as little as 4 KBPS to transmit all audible communications using other CODEC technologies. Several other CODECs have been developed including G.722, G.723.1, G.728, G.729, or the GSM coding standard G.729a, often used in IP telephony. Some of these recommendations were developed to help deal with situations where not as much bandwidth was available to carry the voice conversation which is the case in analog and digital cellular environments.

A PSTN digital telco central office receives 64 KBPS calls from TDM circuits (or converts analog circuits to 64 KBPS) and switches each 64 KBPS channel toward a terminating user. If the local central office serves the terminating user, the channel is sent to the local line circuit. If a distant central office serves the terminating user, digital trunks carry the 64 KBPS information transparently to the central office that services the user.

At the receiving end, the digital to analog conversion standard requires that the 64 KBPS channel information be used to reconstruct an analog signal following the G.711 recommendation. The CODEC used (e.g., G.711) at the sending end dictates what CODEC to use at the receiving end. The same standard must be used to decode the 64 KBPS (or other rate) signal as was used to encode it.

During call establishment, bandwidth is reserved from end to end. All of the network components in the call path reserve bandwidth based on which CODEC is in use, and the network components are all synchronized. Network components include the analog to digital converters (CODECs), digital switches, and digital trunks.

Voice packet switching (e.g., IP telephony) is quite different. Historically, packet switching did not reserve bandwidth between end users nor were packets switched based upon packet priority. Standards work in this area is ongoing and these capabilities do exist for some network types.

At the sending end, one method for analog to packet conversion is described by H.245. H.245 permits a call to be handled using G.711, G.722, G.723.1, G.728, G.729, or GSM coding standard. When multiple coding standards are supported by the endpoints, H.323 provides a protocol to resolve which coding standard will be used for any specific call.

A local area network receives packets from connected endpoints or gateways. These packets are routed toward a terminating endpoint or gateway. If the terminating address is not on the same local area network, the packet may be routed via a number of routers, switches, connecting trunks, etc.

At the receiving end, packet to analog conversion is required. The receiving end must use the same conversion standard that was used at the sending end. During call establishment, bandwidth may or may not be reserved from end to end. Network components (hubs, routers, switches, etc.) may or may not implement priority-based packet switching. Thus, there is no guarantee of the end to end packet delay. Voice packets may arrive at the receiving end with different inter-packet arrival times and occasionally out of sequence.

Although each subscriber in the PSTN may appear to have dedicated bandwidth, there are concentration points within the network. Sophisticated engineering algorithms have been developed to help network planners determine where in the network to locate concentration points and what the concentration factors should be. The Erlang is a unit of measurement that describes the utilization of TDM circuits within the PSTN. One Erlang is equivalent to one TDM circuit in use 100% of the time.

Prior to the popular past time of dialing into your local Internet Service Provider (ISP), PSTN engineering rules assumed that the average residential subscriber received or placed 2 phone calls per hour and each call lasted an average of 3 minutes. This yielded an average Erlangs per subscriber line of 0.1. Of the 0.1 Erlangs, 10% were assumed to be originated or terminated outside of the subscriber's central office. In practical terms, this means that (in general) for every 10 Erlangs of subscriber line use, 1 Erlang of trunking capacity to other central offices is required.

With the proliferation of Internet service providers (ISPs), this relationship changed drastically. During the evening hours when Internet use is heavy, a much higher percentage of subscriber traffic leaves the subscribers central office. This change caused telcos to look for alternate means of providing data access to subscribers.

One means at the Local Exchange Carrier's (LEC) disposal is to use a technology known generically as Digital Subscriber Loop or (xDSL). This technology allows analog voice signals to coexist with digital data signals. Subscribers can be directly connected to a data network over their existing twisted pair without interrupting their ability to place phone calls on that same pair. The LEC could then groom the data traffic off the network at the line access point and eliminate the high demand for inter office trunks. In addition, this opened a new revenue stream for LECs by giving them incentive to become ISPs. The deployment of xDSL has been slow, however, and other high speed Internet access methods are on the horizon.

The 1996 Telecommunications Act ushered (or more accurately "is ushering") in a new era of competition in the local service market. A new breed of communications company has been created known as Competitive Local Exchange Carriers or CLECs. Many of the initial CLECs have built their business around offering local service exclusively to the lucrative enterprise business market. The residential market has continued to be monopolized by the LEC.

Regulations bodies have been slow to force LECs to open their local loops at reasonable prices and it's impractical for most CLECs to consider building out a residential network.

Other access means for the "last mile" to the subscriber residence have been slow to develop. Wireless companies are constrained by available RF bandwidth. Cable operators have just recently been pushing data modems into their cable offerings and had considered the "lifeline" telephony service too large a hurdle to overcome.

Initially, cable modems were created to help bring high-speed data access to subscribers that were stuck with 28.8 KBPS modem access. Some ventures have had moderate success, as cable data services have been slow to deploy. Problems with the agreement on standards as well as with old cable plants that did not support 2-way communication made progress slow.

Today, coaxial cable passes 98% of the homes in the United States. 60% of U.S. households subscribe to cable services. In addition, Coaxial Cable Modem standards (known as DOCSIS) currently can provide 2 to 3 times the bandwidth of ADSL technology and are being deployed more quickly.

As competition in the local markets begins to heat up, and with LECs wanting to get into the long distance business, LECs and Inter Exchange Carriers have been consolidating and merging to remain strong. Most Network Access Provider mergers seem to be driven by competition. Traditional telecommunications vendors have been merging with traditional data network vendors to create "Unified Networks" vendors that can deliver both circuit and packet switched networks. Competition and convergence are the two forces driving change in the telecommunications and data communications industries. These two forces often tend to be cumulative in their impact on both traditional Network Access Providers and traditional network infrastructure vendors.

The foregoing illustrates a brief evolution of circuit switched voice and packet switched voice and data services as provided to residential and business subscribers. It is evident that most of the intelligence of these systems is centralized.

SUMMARY OF THE INVENTION

A Residential Access Node (RAN) according to the present invention gives Network Access Providers and Application Service Providers with the ability to deliver multimedia services to subscribers while maintaining control and security over the bandwidth and content delivered.

A RAN is similar to existing cable interface units in that it is mounted outside of a subscriber's home in a weatherproof enclosure and can accommodate coaxial cable, xDSL, or fiber optic cable among others as it's network interface. It is different from existing cable interface units, however, in that it includes a processor, memory and storage, supplies RJ11 analog telephony interfaces and 10/100BaseT Ethernet interfaces in addition to coaxial cable for broadband network and broadcast TV to the customer premises. RAN communicates with a subsystem in the Network Access Provider headend using a protocol specifically defined for RANs. RAN provides value added services without using the service provider's computer resources. Services include room to room calling within the home, always on access to the Internet, virtual private networking support, and usage based metering. RAN also provides industry standard Application Programming Interfaces (APIs) and protocols to support third party development of applications.

RAN's represent a new class of network interface, and a new way of looking at the customer premises. Currently telecommunications and data communications customers (and to some extent cable subscribers) are broadly classified as either "residential" or "business" subscribers. This classification often refers to whether or not the customer premises equipment is to be treated as a device (residential), or as a network (business).

Many products are coming onto the market that allow residential subscribers to create data networks in their homes, but leave the interface to the network unchanged. This makes delivery of services to "residential private networks" clumsy at best.

RAN's provide Network Access Providers with a platform, protocol, and software environment upon which advanced multimedia services can be delivered and metered.

In accordance with a first embodiment of the invention is a residential access node (RAN) running a RAN platform. The RAN platform includes means for interfacing a plurality of peripheral equipment to a packet data network. Each piece of peripheral equipment, however, does not necessarily operate on the same data type. The RAN platform manages exchanges of data packets with other residential access nodes resident on the packet data network. The RAN platform also determines the number and type of data packets entering or departing from a residential access node via the packet data network.

Other aspects and features of the present invention will become apparent to those ordinarily skilled in the art upon review of the following description of specific embodiments of the invention in conjunction with the accompanying figures.

BRIEF DESCRIPTION OF THE FIGURES

FIG. 5 is an illustration of a session in which RAN protocol data and content data are being exchanged among a Customer Premises RAN platform, a managed packet backbone server (MPBS) RAN platform, and an Application Service Provider (ASP) RAN platform.

DETAILED DISCLOSURE OF THE INVENTION

Figure 1:
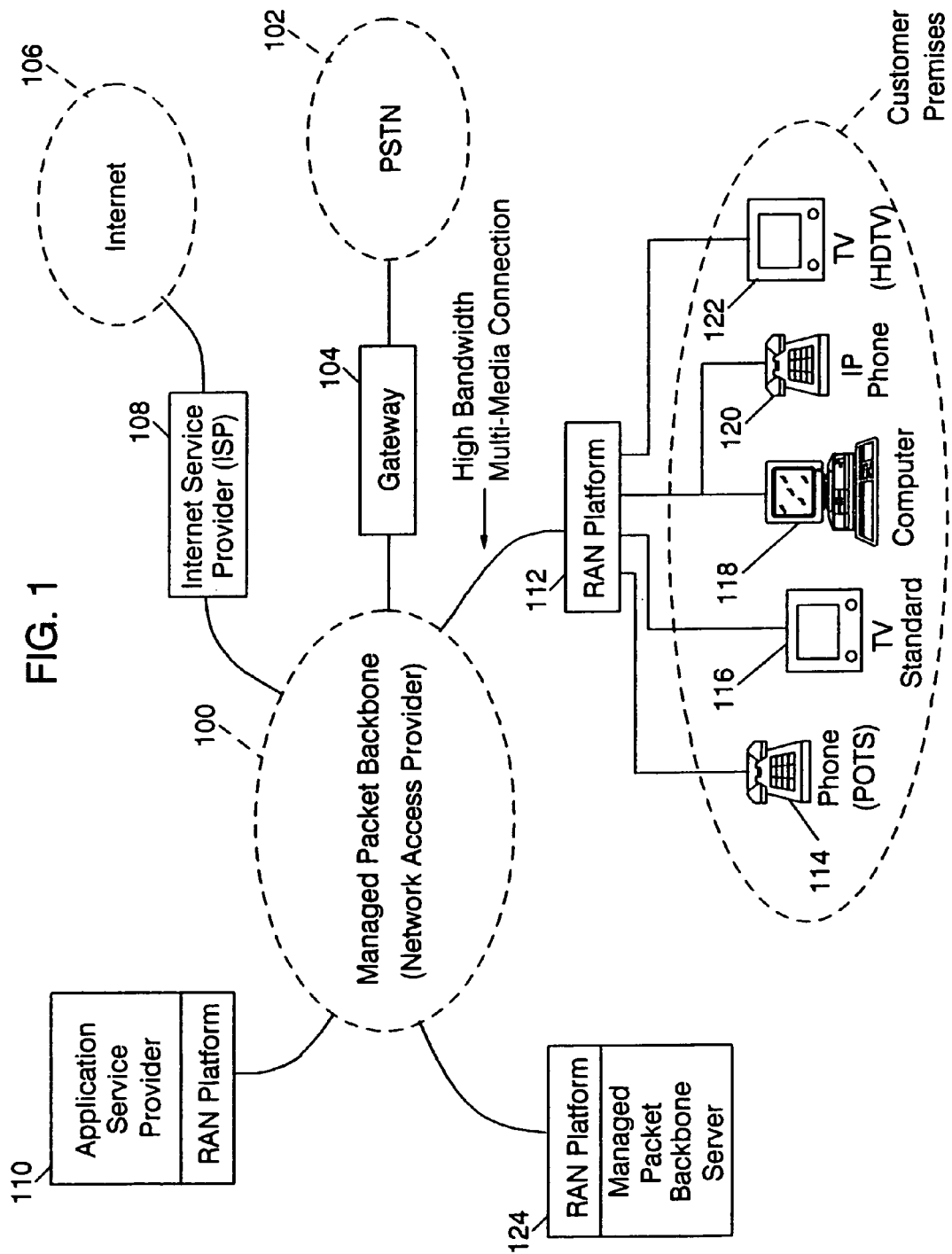
FIG. 1 illustrates an environment in which RANs operate.

No element, step, or instruction used in the description of the present application should be construed as critical or essential unless explicitly described as such.

A Residential Access Node (RAN) is comprised of four basic components. First is a hardware platform for high bandwidth access to an Access Network. Second is a Protocol for communication between the Access Network and the customer (subscriber) premises. Third is a software platform for the delivery of services "at the edge" thereby providing the means for traditional telecommunications networks service providers to distribute capabilities into the home. Fourth is a distributed application environment that can be exploited by a Network Access Provider (NAP) as well as an Application Service Provider (ASP).

A RAN is analogous to the client in a client/server model. A Network Access Provider can implement intelligent packet metering algorithms that support differentiation of IP packets based on their respective content. An Application Service Provider can implement intelligent clients that provide new levels of multimedia inter-activity.

The RAN hardware platform provides three basic functions which include a network interface, an application processing engine, and storage capability. The RAN hardware platform network interface provides a means for interfacing existing or newly developed Customer Premises Equipment (CPE) to the Access Network.

A RAN also provides a broadband network interface (Coaxial Cable) as well as standard coaxial cable, RJ11, and various Ethernet interfaces. In addition to the Access Network and customer premises interfaces, the RAN hardware platform provides a flexible and scaleable application-processing environment. A RAN implements a protocol as well a suite of services and scales from a minimal, low cost implementation to an environment that rivals today's most sophisticated digital switches. A RAN makes use of industry standard CPU hardware to ensure future benefit from "Moore's Law".

The RAN hardware platform further provides the ability to store and retrieve persistent and semi-persistent data at the customer premises. Unlike it's semi-intelligent predecessors, the cable box or ISDN telephone, the RAN hardware platform provides more rewriteable space in which to store it's base software load and application software as well as data collected during operation.

One RAN Platform may reside at the customer premises. In order to provision and maintain it, this Customer Premises RAN platform requires a means to establish communications with the Access Network or, more specifically, a Netwotk Access Provider RAN platform. This is accomplished by means of a defined RAN protocol. The RAN Protocol serves three main purposes. One is to provide a mechanism for Registration, Authentication and Security (RAS) of the connection from the CPE to the Access Network. Another is to provide a mechanism for the delivery of and billing for services. A third is to provide a mechanism for route discovery and advertisement.

As stated above, a RAN includes an interface to the Access Network for all services provided. As such, there is a need to ensure that services are delivered only to authorized subscribers. Further, the delivery of these services should be done in a secure manner so as to protect the privacy of the subscriber, the Network Access Provider, and Application Services Providers. Security should also provide a means for preventing fraudulent use of network facilities.

A RAN implements a protocol for establishing communications with the Access Network. This protocol includes a mechanism by which each RAN identifies itself to the Access Network and requests service by a mechanism in which each RAN identifies its service capabilities, such as max/min bandwidth requirements, subscriber features supported, network interfaces supported, applications in residence on the RAN, available network routes, subscriber addresses/aliases supported, and a means by which user profile information is downloaded from the Network Access Provider.

A RAN also implements a protocol for authenticating subscriber access. This protocol includes a software means by which the Network Access Provider grants or denies access to each individual RAN, a software means by which the Network Access Provider grants or denies services on a per use basis, and a software means by which Application Service Providers grant or deny services on a per use and/or user basis without intervention of the Network Access Provider.

A RAN implements a protocol for providing secure access to the Access Network. This protocol includes a means by which the network and a Customer Premises RAN can pass raw data and application specific data securely over the Access Network, and a means by which RANs can pass application specific data to other RANs securely over the Access Network.

Delivery of services to subscribers is the basis for existence of all of the rest of the network capabilities. Billing for these services (either directly or indirectly) is what makes it worthwhile. A RAN implements a protocol that enables the delivery and subsequent billing for services. This protocol includes a means by which packet metering (billing) for raw data flows can be established and reported back to the Network Access Provider RAN platform, a means by which packet metering (billing) for data flows based on other parameters, such as time of day, content, or day of week, can be established and reported back to the Network Access Provider RAN platform, a means by which the above capabilities can be delivered between an Application Service Provider and a RAN subscriber without the intervention of the Network Access Provider, and a means by which the Network Access Provider can offer the above services to an Application Service Provider without the intervention of the subscriber.

As services migrate from the Access Network to the Customer Premises Equipment (CPE), more and more switching and routing functions will also migrate. A RAN will then require a means to maintain its view of neighboring networks and links. RAN route discovery and advertisement are patterned after the processes currently defined by the ATM Forum entitled Public Network to Network Interface (PNNI). These capabilities allow a RAN to independently switch/route data between itself and other RANs in the network. This capability will enhance RAN's ability to establish and maintain Virtual Private Networks as well as to provide more enhanced services at the network edge.

As was outlined above, RAN is intended to run on more than one hardware platform. To facilitate this, the software is independent from the hardware platform and operating system. A RAN maintains an abstraction layer for those services required from the operating system. To support these activities the RAN implements software application programming interfaces such as TAPI, TSAPI, MAPI, and CSTA. In addition, the RAN platform serves as a residential gateway into a packet telephony based network. To support this type of interface, H.323, MGCP, SIP, Q.931, MEGACO and DOCSIS protocols can be implemented.

A RAN opens the door to distributing services to residential and small business customers by providing a universal platform. Applications like those found on a traditional PBX are easily integrated onto the RAN platform. Services typically provided by the Network Access Provider can now reside on the RAN platform easing the computing load required of the network.

FIG. 1 illustrates a typical RAN environment. For purposes of illustration, only one Customer Premises RAN platform and one Application Service Provider RAN platform are shown. The network, however, can support multiple Customer Premises and Application Service Provider RAN platforms.

At the center of this RAN based network architecture is a managed packet backbone 100 which may be owned and operated, for example, by a Network Access Provider (NAP). Managed packet backbone 100 is the communication link among several other networks and entities. For instance, managed packet backbone 100 can connect to the public switched telephone network (PSTN) 102 via a gateway 104. Managed packet backbone 100 can also connect to the Internet 106 via an Internet service provider (ISP) 108. The real advantage of this RAN based network, however, is its high bandwidth connection between Application Service Provider RAN platform 110 and Customer Premises RAN platform 112 via managed packet backbone 100.

Customer Premises RAN platform 112 can physically reside at the customer or subscriber premises and connects to all of the customer premises equipment (CPE) such as analog telephone(s) 114, standard television(s) 116, computer(s) 118, IP telephone(s) 120, and high definition television(s) (HDTV) 122.

Application Service Provider (ASP) is an entity that offers services and content over a network directly to a subscriber or network participant. To be of any value to a subscriber, content must be "downloadable" at high data rates. As such, broadband network connections (i.e., those capable of high multi-media data throughput) are utilized end to end between Customer Premises RAN platform 112 and Application Service Provider RAN platform 110. The Network Access Provider maintains managed packet backbone 100 with the assistance of a managed packet backbone server (MPBS) 124.

Figure 2:
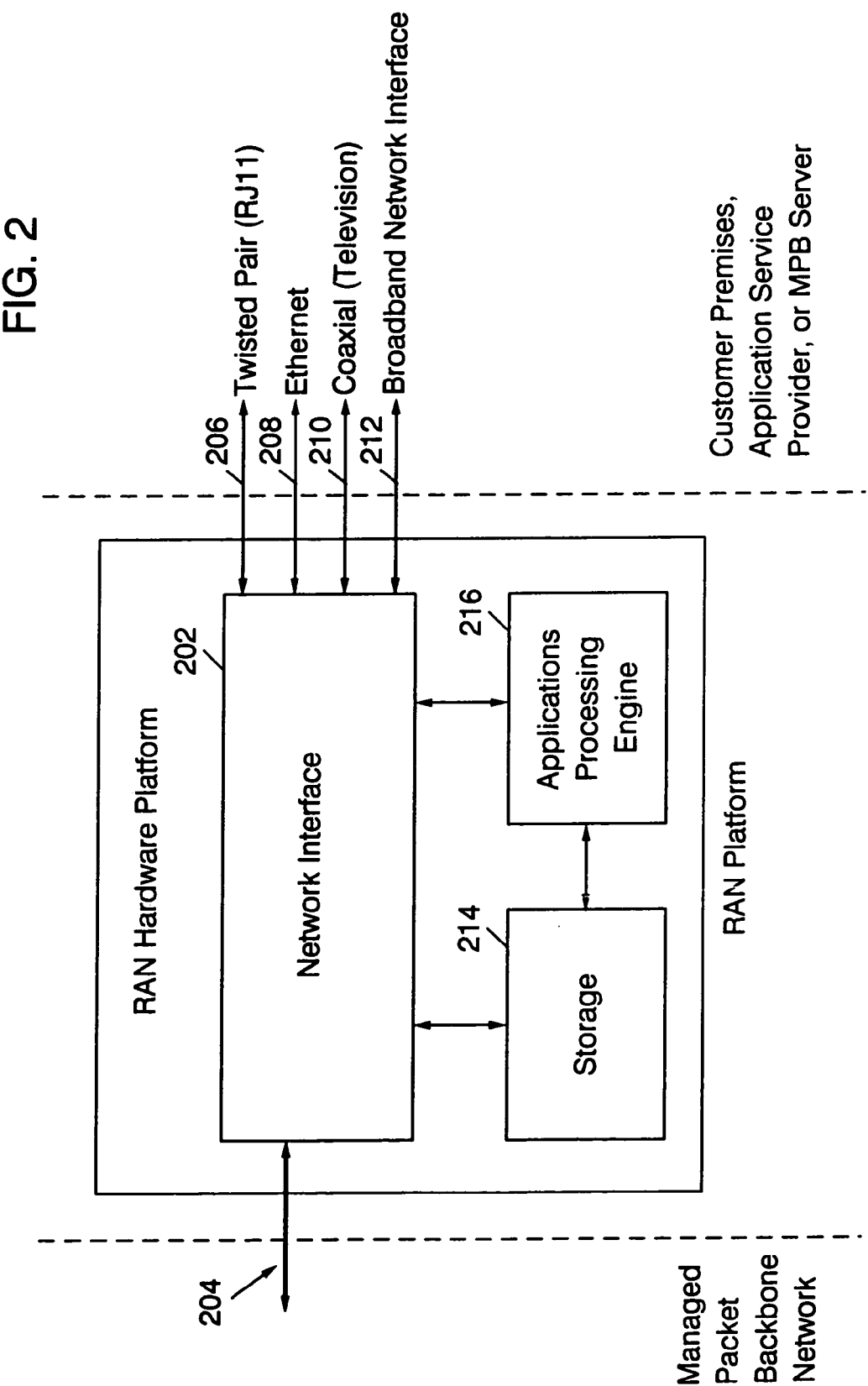
FIG. 2 illustrates a diagram of a RAN hardware platform.

FIG. 2 illustrates a diagram of a typical RAN hardware platform. Since a RAN is capable of receiving and distributing many different multi-media signals it possesses a hardware platform capable of receiving and distributing the various multi-media signals. At the heart of a RAN hardware platform is a network interface 202 that receives an integrated signal arriving on a high bandwidth connection 204. Network interface 202 distributes the various components of the integrated signal to end user devices or interfaces accordingly.

There are at least four types of signals that RANs will distribute within a residence. One signal is an RJ11 twisted pair analog voice signals 206. This is a common standard analog telephone signal. Another signal is an Ethernet data signal 208 for handling packet based data signals. A third signal is a coaxial signal 210 containing standard definition television signals. A fourth signal is a broadband broadcast signal 212 carrying high definition television signals.

In addition to network interface 202, the RAN hardware platform also includes storage (memory) 214 and an applications processing engine 216. Applications processing engine 216 includes a processor and executes resident RAN software.

Figure 3:
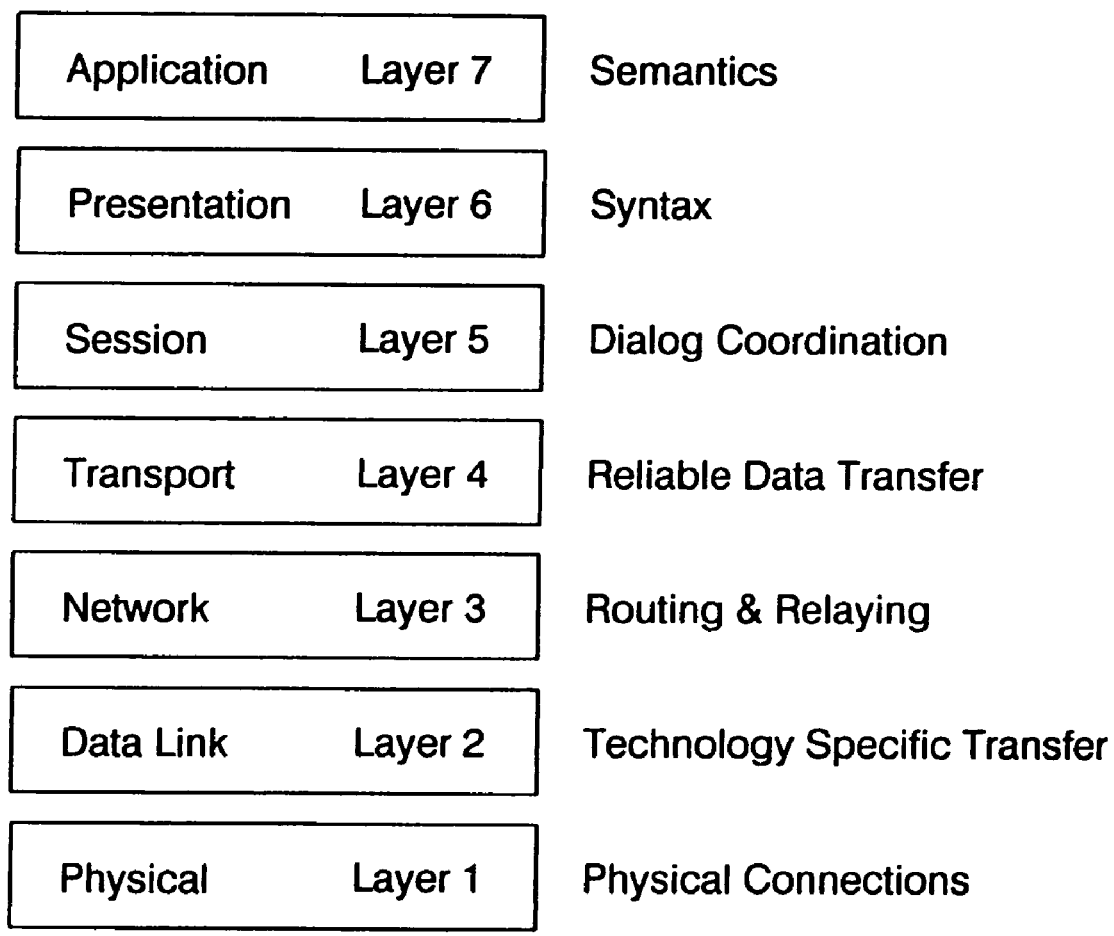
FIG. 3 is a prior art illustration of OSI stack layers.

FIG. 3 is a prior art illustration of OSI stack layers. OSI stands for "Open Systems Interconnection" and was developed by the International Standards Organization. OSI is a framework of standards for communication between different systems made by different vendors. The goal was to create an open systems networking environment where any vendor's computer system, connected to any network, can freely share data with any other computer system on that network or a linked network. The OSI model illustrated in FIG. 3 organizes the communications process into seven (7) different categories and places these categories in a layered sequence based on their relation to the user. Layers 7 through 4 concern end to end communications between a message source and a message destination, while layers 3 through 1 concern network access.

Layer 1, the physical layer, pertains to the physical means of sending data over lines (i.e., the electrical, mechanical, and functional control of data circuits). Layer 2, the data link layer, pertains to procedures and protocols for operating the communications lines. It also includes means for detecting and correcting message errors. Layer 3, the network layer, pertains to how data is transferred between computers. It also addresses routing within and between individual networks. Layer 4, the transport layer, pertains to the rules for information exchange and manages end-to-end delivery of information within and between networks, including error recovery and flow control. Layer 5, the session layer pertains to dialog management. It controls the use of the basic communications facility provided by the transport layer. Layer 6, the presentation layer, provides transparent communication services by masking the differences of varying data formats (character codes, for instance) between dissimilar systems. Layer 7, the applications layer, pertains to functions for particular applications services, such as file transfer, remote file access, and virtual terminals.

Figure 4:
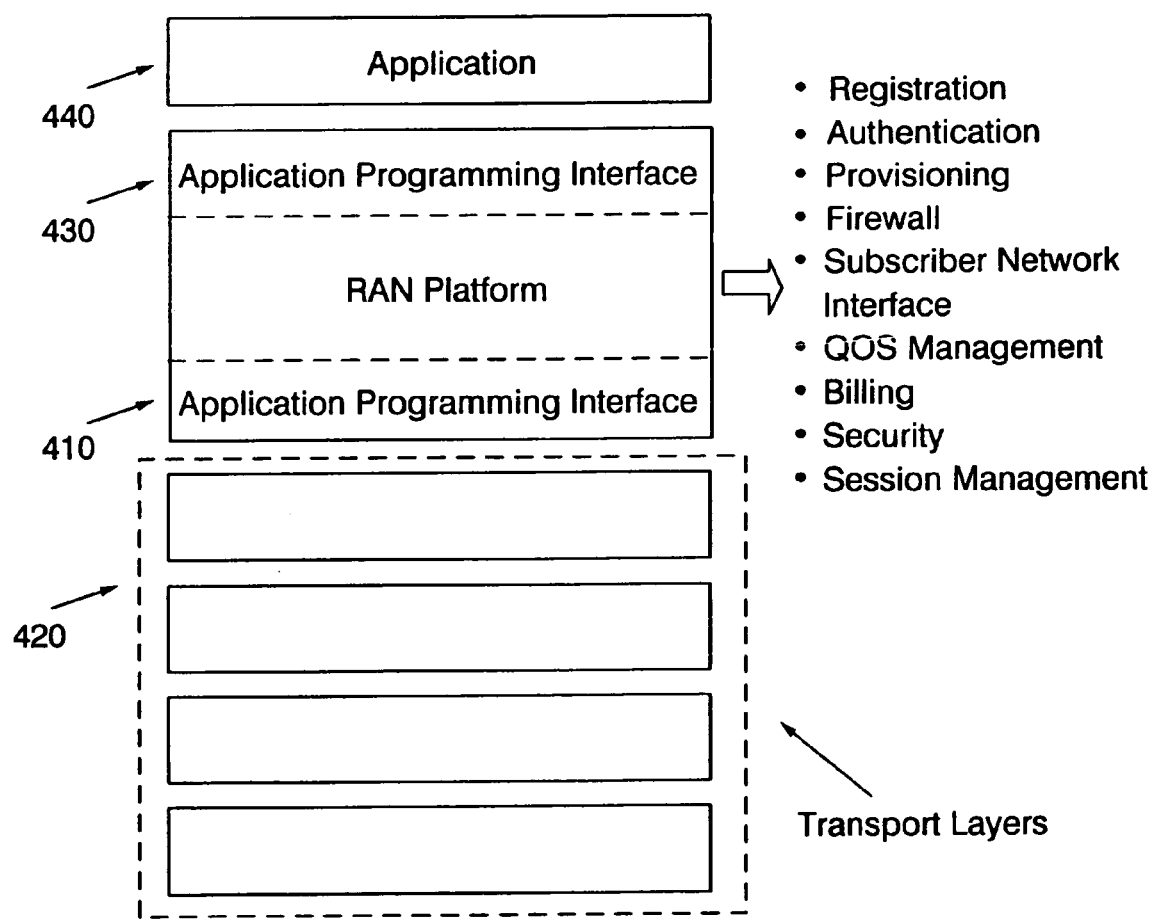
FIG. 4 is an illustration of OSI stack layers as applied to one embodiment of the present invention.

FIG. 4 is an illustration of OSI stack layers as applied to one embodiment of the present invention. Layers 5 and 6 play an important role in RAN architecture. As stated above, the session layer pertains to dialog management controlling the use of the basic communications facility provided by the transport layer(s) while the presentation layer provides transparent communication services by masking the differences of varying data formats between dissimilar systems. As applied to the present invention, a RAN protocol and software platform performs numerous functions at the session and presentation OSI layers. These functions include, but are not limited to, account registration, account authentication, address provisioning, firewall and other security measures, billing services, QOS management, and subscriber network interface management. A RAN software platform is responsible for protocol and content communications on a per session basis among Customer Premises, Application Service Provider, and Network Access Provider RAN platforms. To achieve its functions, RAN software utilizes an application programming interface 410 between itself and the OSI transport layers 420 and another application programming interface 430 between itself and a specific application 440.

RAN functionality includes a mechanism by which each RAN identifies itself to the Network Access Provider and requests service by a mechanism in which each RAN identifies it's service capabilities, such as max/min bandwidth requirements, subscriber features supported, network interfaces supported, applications in residence on the RAN, available network routes, subscriber addresses/aliases supported, and a means by which user profile information is downloaded from the Network Access Provider.

With respect to authenticating subscriber access, RAN protocol includes a means by which the Network Access Provider grants or denies access to each individual RAN, a means by which the Network Access Provider grants or denies services on a per use basis, and a means by which Application Service Providers grant or deny services on a per use and/or user basis without intervention of the Network Access Provider.

RAN also implements a protocol for providing secure access to the Access Network. This protocol includes a means by which the network and a Customer Premises RAN pass data securely over the Access Network, and a means by which RANs pass application specific data to other RANs securely over the Access Network.

FIG. 5 is an illustration of RAN protocol data 510 exchanges and content data 520 exchanges among a Customer Premises RAN platform, a managed packet backbone server (MPBS) RAN platform, and an Application Service Provider RAN platform. FIG. 5 is best described with reference to a practical example of RAN architecture in operation.

Take the case of a network subscriber using his Customer Premises RAN platform 112 that wishes to download a movie from an Application Service Provider (ASP) specializing in "movie rentals" via the ASP RAN platform 110. There are several factors to consider in this proposed transaction. These factors, in no particular order, include, the subscriber making the download request to the ASP, the ASP verifying the identity of the subscriber, the ASP transferring the movie to the subscriber, and the ASP billing the subscriber for the movie. We now examine each part of the transaction with respect to RAN architecture.

The subscriber initially makes a request to the ASP for a particular movie. This necessarily entails the subscriber having access to the ASP system. Most likely access will be based upon methods currently in use today, e.g., a web browser interface to a web page managed by the ASP. The web page would likely list the movies available for download and provide a means for effecting a download such as clicking on an icon representing the movie. Assume the subscriber selects a movie and clicks on the "download movie" icon or its equivalent. Clicking on the icon initiates a specialized session between the ASP RAN platform 110 and the subscriber's Customer Premises RAN platform 112.

The subscriber's Customer Premises RAN platform 112 registration data is sent to the managed packet backbone server (MPBS) RAN platform 124 for authentication. Upon authentication, MPBS RAN platform 124 provides address provisioning and security between the ASP RAN platform 110 and the subscriber's Customer Premises RAN platform 112 so that the subscriber, and only the subscriber, will receive the content requested from the ASP.

During registration, the MPBS RAN platform 124 receives pertinent data from the subscriber's Customer Premises RAN platform 112 and the ASP RAN platform 110 and can quickly perform the above mentioned functions. The pertinent data includes each RAN identifying it's service capabilities, such as max/min bandwidth requirements, subscriber features supported, network interfaces supported, applications in residence, available network routes, subscriber addresses/aliases supported, and a means by which user profile information is downloaded from the Network Access Provider.

Using the MPBS RAN platform 124 as an intermediary (e.g., a service broker) between ASPs and subscribers creates a system where individual subscribers do not need to register with individual ASPs. The managed packet backbone server is responsible for matching an ASP with a subscriber on a per use basis. Thus, in the movie example above, when a subscriber initiates a session with a particular ASP, the ASP queries the MPBS with respect to the subscriber and the MPBS manages the entire transaction with the notable exception of content delivery which is between the ASP and the subscriber directly.

Once a secure session has been established between the subscriber and the ASP, the content 520 is ready to be downloaded over managed packet backbone 100 to the subscriber. The content of this example (multi-media data) can be very large in size. Thus, high bandwidth connections facilitate such data transfers. Without a high bandwidth connection between the ASP and the subscriber, downloading a typical movie could take several hours. If a download takes too long it becomes a much less attractive alternative to subscribers.

MPBS RAN platform 124 provisions a direct high bandwidth connection between the ASP RAN platform 110 and the subscriber's Customer Premises RAN platform 112 complete with security measures. At this point in the session for this connection established by MPBS RAN platform 124 the movie is downloaded to the subscriber over managed packet backbone 100. Bandwidth allocation and billing can vary depending on the content involved.

In order to make the transaction complete, the ASP, and the Network Access Provider (NAP) must be able to bill for their services. The NAP owns and manages packet backbone 100. It is their physical connections that are being used to deliver the content. There are two fundamental methods of billing in this RAN based system. One method is to bill on a flat fee basis for services. The other is to bill on a per packet basis for services. The former would charge a uniform fee based on the service requested. In the movie example, the fee could be $3.50 to download a movie billed to either the subscriber or the Application Service Provider. If billed to the Application Service Provider, the Application Service Provider would then collect the fee from the subscriber. The latter method would charge a variable fee depending on the impact of the packet transfer to the NAP's infra-structure. Referring again to the movie example, a 90 minute movie without a lot of special effects can be transmitted in a lesser number of data packets than a 2½ hour tech laden movie. Thus, the impact to the NAP can be measured by the number and type of data packets required to achieve a task. If the number and type of data packets used to achieve a task can be determined, a variable tariff can be set. This requires the creation of packet metering algorithms.

Packet metering algorithms monitor the amount and type of data traveling between an Application Service Provider RAN platform 110 to a Customer Premises RAN platform 112. Packet metering involves having the Customer Premises (subscriber) RAN platform 112 log and pass billing information (number and type of data packets) to the managed packet backbone server (MPBS) RAN platform 124 on a solicited or unsolicited basis once the session has terminated.

RAN billing protocol includes a means by which packet metering (billing) for raw data flows can be established and reported back to the Network Access Provider RAN platform, a means by which packet metering for data flows based on other parameters, such as time of day, content, day of week, can be established and reported back to the Network Access Provider RAN platform, a means by which the above capabilities can be delivered between an Application Service Provider and an RAN subscriber without the intervention of the Network Access Provider, and a means by which the Network Access Provider can offer the above services to an Application Service Provider without the intervention of the subscriber.

FIGS. 6A–D illustrate RAN registration, session establishment, an actual session, and session reporting flowcharts.

Figure 6A:
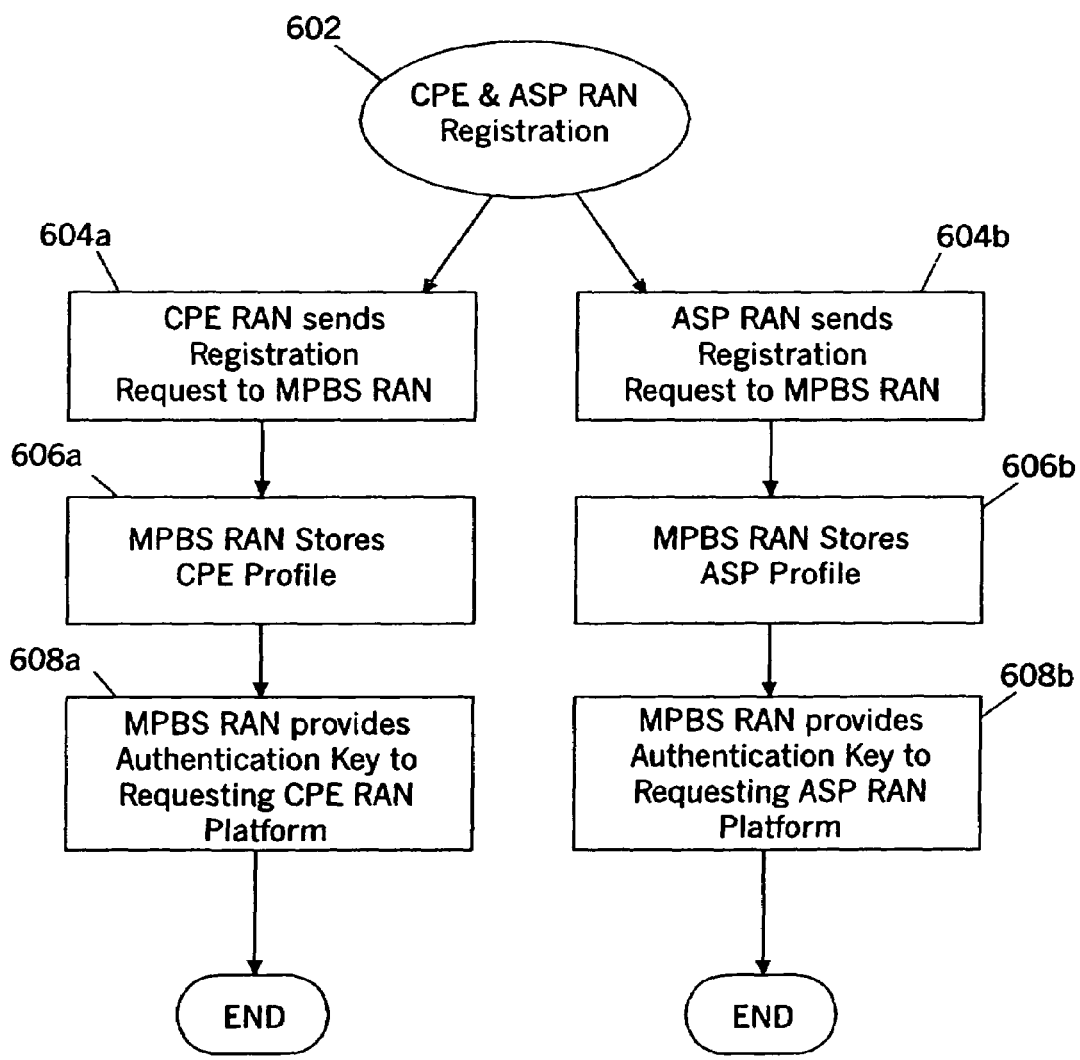
FIG. 6A illustrates a RAN registration process.

FIG. 6A illustrates the registration process 602 that occurs when a new RAN platform goes on-line with the managed packet backbone. Registration occurs for both Customer Premises Equipment (CPE) RAN platforms and Application Service Provider (ASP) RAN platforms. When a new CPE RAN joins the managed packet backbone of the Network Access Provider (NAP), the CPE RAN sends a registration request 604a to the managed packet backbone server (MPBS) RAN. The registration request contains a profile of the requesting CPE RAN platform. The profile includes data pertaining to the address of the CPE RAN, and the capabilities of the CPE RAN platform. Capabilities include, but are not limited to, the bandwidth that the CPE RAN can support, the network connections that the CPE RAN can support, the applications that the CPE RAN can support, any account information associated with the CPE RAN, etc. The MPBS RAN, in its capacity of a service broker, stores the profile information 606a. The MPBS concludes the registration process by issuing an authentication key 608a to the requesting CPE RAN. The authentication key is used by the CPE RAN when it wishes to establish a session with another member (CPE or ASP RAN platform) of the managed packet backbone.

Similarly, when a new ASP RAN goes on-line, the ASP RAN sends a registration request 604b to the managed packet backbone server (MPBS) RAN. The registration request contains a profile of the requesting ASP RAN platform. The profile includes data pertaining to the address of the ASP RAN, and the capabilities and services of the ASP RAN platform. Capabilities include, but are not limited to, the bandwidth that the ASP RAN can support, the network connections that the ASP RAN can support, the applications that the ASP RAN can support, any account information associated with the ASP RAN, etc. The MPBS RAN stores the ASP RAN profile information 606b. The MPBS concludes the registration process by issuing an authentication key 608b to the requesting ASP RAN. The authentication key is used by the ASP RAN when it wishes to establish a session with another member (CPE or ASP RAN platform) of the managed packet backbone.

Figure 6B:
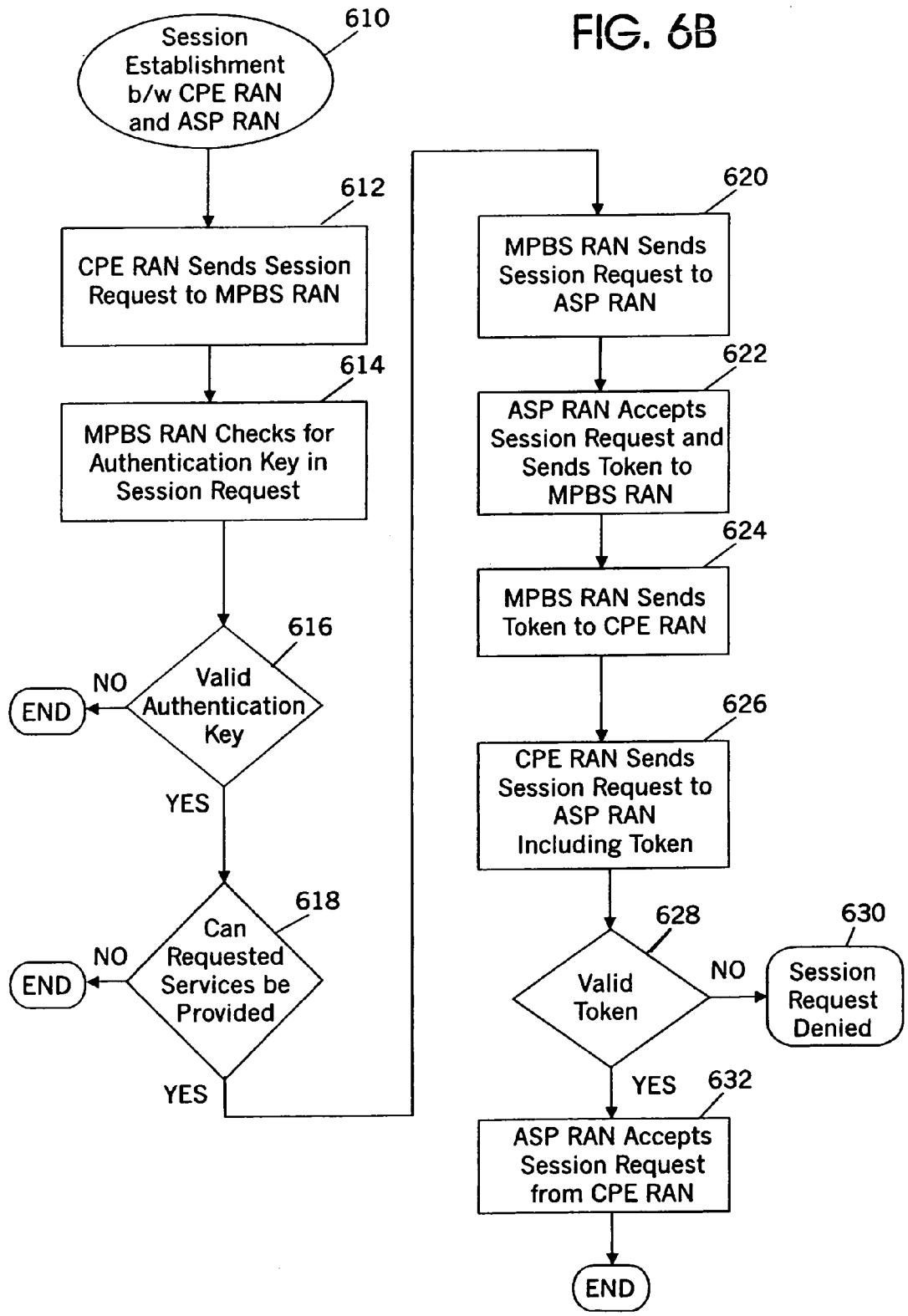
FIG. 6B illustrates a RAN to RAN session establishment process.

FIG. 6B illustrates the session establishment process 610 between a CPE RAN and an ASP RAN. When a CPE RAN wishes to order a movie, for instance, from an ASP RAN that provides such a service, the CPE RAN first establishes a session with the ASP RAN. The CPE RAN sends a session request to the MPBS RAN 612. The session request includes details about the requested session such as the destination address (most likely in an alias form) and the amount of bandwidth requested for the session. The MPBS RAN acts as a service broker. Once it receives the session request from the CPE RAN the MPBS RAN checks for the authentication key 614 the CPE RAN was issued when it registered. The MPBS RAN then validates 616 the authentication key. If the authentication key is missing or invalid then the session establishment is terminated. An error message or other type of interrupt message may be sent to the CPE RAN explaining the reason for termination. If the authentication key is valid then the MPBS RAN determines whether the requested services can be provided 618 between the CPE and the ASP RANs. The MPBS RAN determines this by accessing the RAN profiles of the CPE and ASP in question. If the request for services can not be handled then the 1 MPBS RAN terminates the session establishment. Again, an error message or other type of interrupt message may be sent to the CPE RAN explaining the reason for termination. Otherwise, the MPBS RAN sends a session request to the ASP RAN 620. The ASP RAN accepts the session request 622 and sends a token associated with that specific request back to the MPBS RAN. The MPBS RAN then forwards the token 624 to the CPE RAN informing the CPE RAN that a session can be established. The CPE RAN then sends a session request 626 including the token directly to the ASP RAN. The ASP RAN validates the token 628 and denies the session request 630 if the token is invalid or accepts the session request 632 if the token is valid.

Figure 6D:
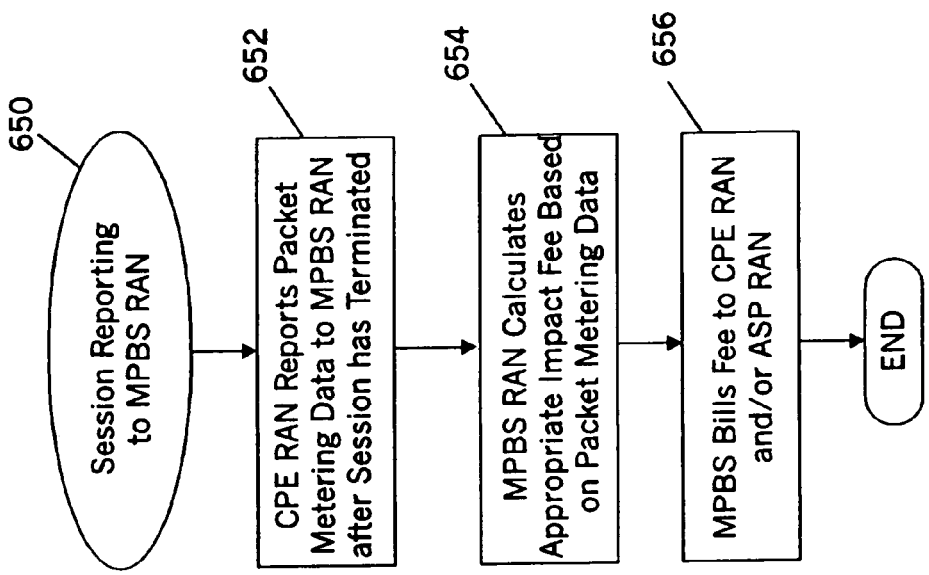
FIG. 6D illustrates a RAN reporting session.
Figure 6C:
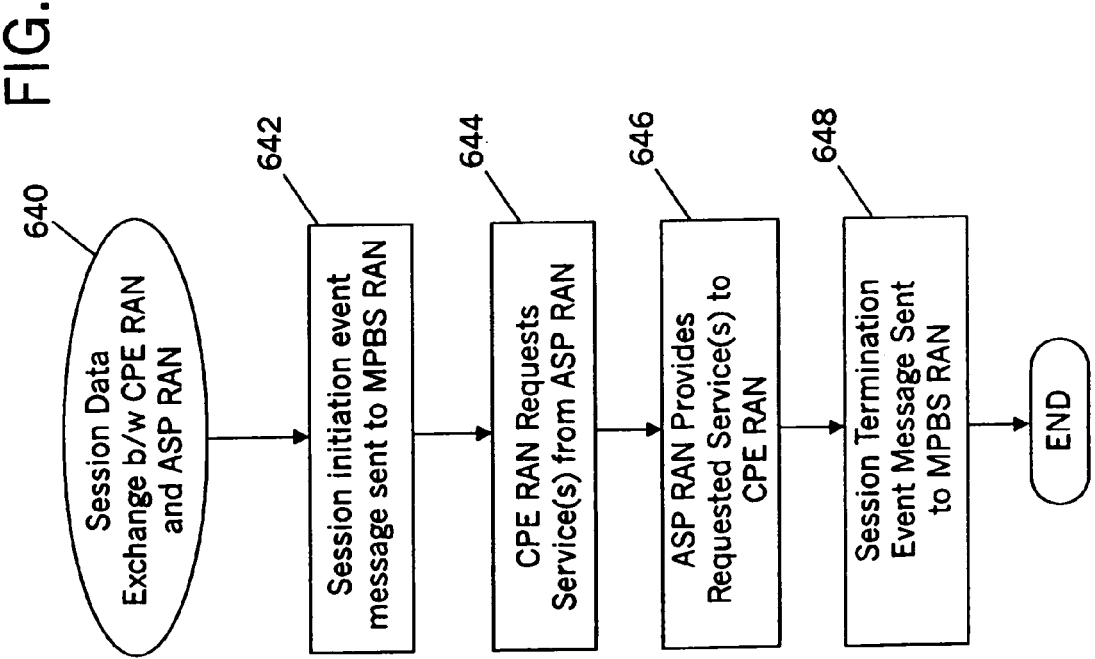
FIG. 6C illustrates a RAN to RAN session.

Once a session has been established, data can be exchanged 640, as shown in FIG. 6C, between the CPE RAN and the ASP RAN according to the parameters of the session request. A session initiation event message is sent 642 by the CPE RAN to the MPBS RAN. The MPBS RAN records the commencement and termination of each session between RAN platforms on its network. The CPE RAN makes a specific request 644 of the ASP RAN. For instance, the request could be to stream a movie from the ASP database to the CPE RAN. The ASP complies with the request and streams the requested movie 646 from its database to the CPE RAN over the managed packer backbone using the bandwidth allocated by the MPBS RAN. Upon completion of the "download" a session termination event message is sent 648 from the CPE RAN to the MPBS RAN.

FIG. 6D illustrates the session reporting process 650 that occurs upon the termination of a session between two RAN platforms. When a session has been terminated the CPE (the requesting RAN platform) reports the number and type of data packets that have been received as a result of the session. The MPBS RAN inputs the packet data into a packet metering algorithm which calculates an impact fee 654. The impact fee is then billed out 656 to the ASP RAN and/or the CPE RAN. Alternatively the impact fee may be debited against an account corresponding to the ASP or CPE RAN and maintained by the MPBS RAN.

The flowcharts of FIGS. 6A–D apply to scenarios in which CPE RANs and ASP RANs communicate with one another. The same principles apply to communication between CPE RANs such as, for example, when one CPE RAN platform wishes to engage another CPE RAN platform in a computer video game.

RAN is a cost effective offering that integrates leading edge network and customer premises interfaces with a scaleable, programmable, application environment and supporting protocol. This combination provides Network Access Providers with the opportunity to open new revenue streams by delivering value-added services to both subscribers and Application Service Providers.

It is to be understood that the present invention illustrated herein is readily implementable by those of ordinary skill in the art as a computer program product having a medium with a computer program embodied thereon. The computer program product is capable of being loaded and executed on the appropriate computer processing device(s) in order to carry out the method or process steps described. Appropriate computer program code in combination with hardware implements many of the elements of the present invention. This computer code is often stored on storage media. This media can be a diskette, hard disk, CD-ROM, optical storage media, or tape. The media can also be a memory storage device or collection of memory storage devices such as read-only memory (ROM) or random access memory (RAM). Additionally, the computer program code can be transferred to the appropriate hardware over some type of data network.

The present invention has been described, in part, with reference to flowchart illustration(s) or message diagram(s). It will be understood that each block of the flowchart illustration(s) or message diagram(s), and combinations of blocks in the flowchart illustration(s) or message diagram(s), can be implemented by computer program instructions.

These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block(s) or message diagram(s).

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block(s). The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block(s) or message diagram(s).

Accordingly, block(s) of flowchart illustration(s) or message diagram(s) support combinations of means for performing the specified functions, combinations of steps for performing the specified functions and program instruction means for performing the specified functions. It will also be understood that each block of flowchart illustration(s) or message diagram(s), and combinations of blocks in flowchart illustration(s), or message diagram(s) can be implemented by special purpose hardware-based computer systems that perform the specified functions or steps, or combinations of special purpose hardware and computer instructions.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A computer system for managing data exchanges among a plurality of network nodes in a managed packet network, comprising:
   a managed packet backbone server (MPBS) disposed to communicate with and control resource allocation among the plurality of network nodes in the managed packet network;
   at least one Customer Premises Equipment (CPE) node communicable with the managed packet backbone server (MPBS), wherein said at least one CPE node transmits a registration request to the MPBS comprising a CPE profile; and
   at least one Application Service Provider (ASP) node communicable with the managed packet backbone server (MPBS), wherein said at least one ASP node transmits a registration request to the MPBS comprising an ASP profile;
   wherein
   the managed packet backbone server (MPBS) manages transactions among said at least one Customer Premises Equipment (CPE) node and said at least one Application Service Provider (ASP) node and reserves resources among the plurality of network nodes in the managed packet network to provide managed data communications between said at least one Customer Premises Equipment (CPE) node and said at least one Application Service Provider (ASP) node.

2. The computer system of claim 1, wherein said CPE profile comprises the bandwidth and network connection types supported by the CPE node and said ASP profile comprises the bandwidth and network connection types supported by the ASP node.

3. The computer system of claim 2, wherein said CPE profile further comprises applications resident on the CPE node and features supported by the CPE node, and wherein said ASP profile further comprises applications resident on the ASP node and features supported by the ASP node.

4. The computer system of claim 3, wherein said CPE profile and said ASP profile further comprises account information that distinctly identifies the respective at least one CPE node and the at least one ASP node.

5. The computer system of claim 4, wherein said CPE node receives an integrated signal comprising a plurality of component multi-media signals, and wherein said CPE node processes and distributes the plurality of component multi-media signals to respective user interfaces that make use of said component multimedia signals.

6. The computer system of claim 5, wherein said MPBS communicates with said CPE node and said ASP node using a managed packet network protocol, said managed packet network protocol comprising a mechanism for registration, authentication and security (RAS), a mechanism providing billing service, and a mechanism providing route discovery and advertisement.

7. The computer system of claim 6 wherein the managed packet backbone server (MPBS) issues an authentication key to the at least one Customer Premises Equipment (CPE) node it registers.

8. The computer system of claim 7 wherein the managed packet backbone server (MPBS) issues an authentication key to the at least one Application Service Provider (ASP) node it registers.

9. The computer system of claim 8 wherein a request from the at least one Customer Premises Equipment (CPE) node to establish a session with the at least one Application Service Provider (ASP) node is managed by the managed packet backbone server (MPBS).

10. The computer system of claim 8 wherein a request from the at least one Customer Premises Equipment (CPE) node to establish a session with another Customer Premises Equipment (CPE) node is managed by the managed packet backbone server (MPBS).

11. The computer system of claim 9 wherein when the managed packet backbone server (MPBS) receives a request from the at least one Customer Premises Equipment (CPE) node to establish a session with the at least one Application Service Provider (ASP) node, the managed packet backbone server (MPBS):
   verifies that the Customer Premises Equipment (CPE) node has a valid authentication key,
   sends a session request to the Application Service Provider (ASP) node,
   receives a session token from the Application Service Provider (ASP) node, and
   sends the session token to the Customer Premises Equipment (CPE) node.

12. The computer system of claim 11 wherein one of the at least one Customer Premises Equipment (CPE) nodes initiates a session with one of the at least one Application Service Provider (ASP) nodes by sending a session request to one of the at least one Application Service Provider (ASP) nodes including the session token obtained from the managed packet backbone server (MPBS).

13. The computer system of claim 12 wherein one of the at least one Application Service Provider (ASP) nodes verifies a received session token and establishes a session with one of the at least one Customer Premises Equipment (CPE) nodes if the session token is valid.

14. The computer system of claim 13 wherein one of the at least one Customer Premises Equipment (CPE) nodes sends a session initiation event message to the managed packet backbone server (MPBS) upon establishment of a session with one of the at least one Application Service Provider (ASP) nodes.

15. The computer system of claim 14 wherein one of the at least one Customer Premises Equipment (CPE) nodes sends a session termination event message to the managed packet backbone server (MPBS) upon termination of a session with one of the at least one Application Service Provider (ASP) nodes.

16. The computer system of claim 15 wherein one of the at least one Customer Premises Equipment (CPE) nodes sends data pertaining to the number and type of data packets received during a session with one of the at least one Application Service Provider (ASP) node to the managed packet backbone server (MPBS).

17. The computer system of claim 16 wherein the managed packet backbone server (MPBS) calculates a fee based on the data pertaining to the number and type of data packets exchanged in a session.

18. The computer system of claim 17 wherein the managed packet backbone server (MPBS) bills an account associated with one of the at least one Customer Premises Equipment (CPE) nodes.

19. The computer system of claim 17 wherein the managed packet backbone server (MPBS) bills an account associated with one of the at least one the Application Service Provider (ASP) nodes for the session.

20. A managed packet backbone server (MPBS) for managing data exchanges among a plurality of network nodes in a managed packet network comprising:
   a registration component responsive to said plurality of network nodes in the managed packet network, for:
      receiving registration requests comprising node profiles from the plurality of network nodes in the managed packet network, wherein said node profiles comprise the bandwidth and network connection types supported by said plurality of network nodes;
      storing said node profiles;
      providing an authentication key to the plurality of network nodes;
   a session establishment component responsive to said plurality of network nodes in the managed packet network, for:
      receiving a session request message from a first network node in the managed packet network that wishes to establish a session with a second network node in the managed packet network, said session request message including the authentication key associated with the first network node;
      verifying the validity of the authentication key associated with the first network node;
      sending a session request message to the second network node;
      receiving a session token from the second network node;
      sending the session token to the first network node;
      reserving resources among the plurality of network nodes in the managed packet network to provide managed data communications between the first network node and the second network node; and
      managing the transmission of session data as part of an integrated signal comprising a plurality of component multi-media signals to the first network node, wherein said first network node processes and distributes the plurality of component multi-media signals to respective user interfaces that make use of said component multimedia signals.

21. The MPBS of claim 20, further comprising a session reporting component responsive to said plurality of network nodes, for:
   receiving packet metering data pertaining to the amount and type of data exchanged over the managed packet network during a session between two network nodes; and
   calculating a fee based on the packet metering data.

22. A Customer Premises Equipment (CPE) node of a managed packet network comprising:
   a registration component responsive to a managed packet network server node that manages data exchanges among a plurality of network nodes in the managed packet network, said registration component for:
      sending a registration request comprising a CPE profile to the managed packet network server node, wherein said CPE profile comprises the bandwidth and network connection types supported by said CPE node;
      receiving an authentication key from the managed packet network server node; and
   a session establishment component responsive to a server node, for:

sending a session request message to the managed packet network server node, said session request message including the authentication key and the address of a managed packet network node that the Customer Premises Equipment (CPE) node wishes to establish a session with;

receiving a session token from the managed packet network server node, said session token including indication of reserved resources among the plurality of nodes in the managed packet network for providing managed data communications between the Customer Premises Equipment (CPE) node and the managed packet network node that the Customer Premises Equipment (CPE) node wishes to establish a session with;

sending a session request message to the managed packet network node that the Customer Premises Equipment (CPE) node wishes to establish a session with, said session request message including the session token; and receiving session data as part of an integrated signal comprising a plurality of component multi-media signals, wherein said CPE node processes and distributes the plurality of component multi-media signals to respective user interfaces that make use of said component multimedia signals.

23. The CPE node of claim 22, further comprising a session reporting component responsive to the managed packet network server node, for:

sending data to the managed packet network server node pertaining to the amount and type of data exchanged over the managed packet backbone network during the session.

24. An Application Service Provider (ASP) node in a managed packet network comprising:

a registration component responsive to a managed packet network server node that manages data exchanges among a plurality of network nodes in the managed packet network, said registration component for:

sending a registration request comprising an ASP profile to the managed packet network server node, wherein said ASP profile comprises the bandwidth and network connection types supported by said ASP node; and receiving an authentication key from the managed packet network server node; and a session establishment component responsive to the managed packet network server node, for:

sending a session token to the managed packet network server node; and receiving a session token from the network node that wishes to establish a session, said session token including indication of reserved resources among the plurality of nodes in the managed packet network for managed data communications between the ASP node and the network node that wishes to establish a session; and transmitting session data as part of an integrated signal comprising a plurality of component multi-media signals to the network node that wishes to establish a session.

25. A computer program product for managing data exchanges among a plurality of network nodes in a managed packet network, the computer program product having a medium with a computer program embodied thereon, the computer program product comprising:

computer program code for receiving registration requests comprising network node profiles from the plurality of network nodes in the managed packet network, wherein said network node profiles comprise the bandwidth and network connection types supported by said plurality of network nodes;

computer program code for storing profile information pertaining to the plurality of network nodes in the managed packet network;

computer program code for providing an authentication key to each network node in the managed packet network;

computer program code for receiving a session request message from a first network node in the managed packet network that wishes to establish a session with a second network node in the managed packet network, said session request message including the first network node's authentication key;

computer program code for verifying the validity of the first network node's authentication key;

computer program code for sending a session request message to the second network node;

computer program code for receiving a session token from the second network node;

computer program code for reserving resources among the plurality of network nodes in the managed packet network for establishing managed data communication between the first network node and the second network node corresponding to the capabilities of the first network node and the second network node;

computer program code for sending the session token to the first network node;

computer program code for transmitting session data as part of an integrated signal comprising a plurality of component multi-media signals from the second network node to the first network node, wherein said first network node processes and distributes the plurality of component multi-media signals to respective user interfaces that make use of said component multimedia signals.

26. A computer program product for exchanging data among a plurality of network nodes in a managed packet network, the computer program product having a medium with a computer program embodied thereon, the computer program product comprising:

computer program code for sending a registration request comprising a first network node profile from a first network node in the managed packet network to a managed packet network server node, wherein said network node profile comprises the bandwidth and network connection types supported by the first network node;

computer program code for receiving in the first network node an authentication key from the managed packet network server node;

computer program code for sending a session request message from the first network node to the managed packet network server node, said session request message including the authentication key and the address of a second network node in the managed packet network that the first network node wishes to establish a session with;

computer program code for receiving in the first network node a session token from the managed packet network server node;

computer program code for sending a session request message from the first network node to the second network node, said session request message including the session token;

computer program code for sending, from the first network node, data to the managed packet network server for reserving resources among the plurality of nodes in the managed packet network for establishing managed data communication between the first network node and the second network node corresponding to the capabilities of the first network node and the second network node;

computer program code for sending, from the first network node, data to the managed packet network server pertaining to the amount and type of data exchanged over the managed packet backbone network during the session; and computer program code for receiving, from the second network node, session data as part of an integrated signal comprising a plurality of component multimedia signals from the second network node to the first network node, wherein said first network node processes and distributes the plurality of component multimedia signals to respective user interfaces that make use of said component multimedia signals.

27. A computer program product for exchanging data among a plurality of network nodes in a managed packet network, the computer program product having a medium with a computer program embodied thereon, the computer program product comprising:

computer program code for sending a registration request to a server node in a managed packet network;

computer program code for receiving an authentication key from the server node;

computer program code for sending a session token to the server node;

computer program code for receiving a session token from a network node in the managed packet network that wishes to establish a session; and computer program code for reserving resources among the plurality of network nodes in the managed packet network for establishing managed data communication for the network node in the managed packet network that wishes to establish a session; and computer program code for receiving, from the second network node, session data as part of an integrated signal comprising a plurality of component multimedia signals from the second network node to the first network node, wherein said first network node processes and distributes the plurality of component multimedia signals to respective user interfaces that make use of said component multimedia signals.

28. A method of managing data exchanges among a plurality of network nodes in a managed packet network comprising:

receiving registration requests comprising network node profiles from the plurality of network nodes in the managed packet network, wherein said network node profiles comprise the bandwidth and network connection types supported by the plurality of network nodes;

maintaining network node profiles for the plurality of network nodes connected to the managed packet network;

providing an authentication key to the plurality of network nodes connected to the managed packet network;

receiving session request messages from network nodes connected to the managed packet network that wish to establish sessions with other network nodes connected to the managed packet network;

responding to session request messages from network nodes connected to the managed packet network that wish to establish sessions with other network nodes by establishing sessions between network nodes connected to the managed packet network that wish to establish sessions with other network nodes and reserving resources among the plurality of network nodes in the managed packet network for the managed data communication session between the network nodes; and managing the transmission of session data as part of an integrated signal comprising a plurality of component multi-media signals between network nodes connected to the managed packet network that wish to establish sessions with other network nodes.

29. The method of claim 28 further comprising:

receiving packet metering data pertaining to the amount and type of data exchanged over the managed packet network during a session between two network nodes connected to the managed packet network; and calculating a fee using the packet metering data.

30. A method of exchanging data between network nodes in a managed packet network comprising:

sending a registration request comprising a network node profile to a managed packet network server node, wherein said network node profile comprises the bandwidth and network connection types supported by the network node;

receiving an authentication key from the managed packet network server node;

sending a session request message to the managed packet network server node, said session request message including the authentication key and the address of a network node connected to the managed packet network;

receiving a session token from the managed packet network server node;

sending a session request message, said session request message including the session token;

reserving resources among the network nodes in the managed packet network for the managed data communication session between the network nodes;

receiving session data as part of an integrated signal comprising a plurality of component multi-media signals; and processing and distributing the plurality of component multi-media signals to respective user interfaces that make use of said component multimedia signals.

31. The method of claim 30 further comprising:

sending data to the managed packet network server node pertaining to the amount and type of data exchanged over the managed packet network during the session.

* * * * *